United States Patent Office 3,189,588
Patented June 15, 1965

3,189,588
DENSIFICATION OF POLY-α-OLEFINS
David C. Hull, Hugh J. Hagemeyer, Jr., and Marvin B. Edwards, Longview, Tex., assignors to Eastman Kodak Company, Rochester, N.Y., a corporation of New Jersey
No Drawing. Filed Apr. 1, 1960, Ser. No. 19,180
16 Claims. (Cl. 260—93.7)

This invention relates to a process for the preparation of poly-α-olefins in a dense granular form suitable for molding or extrusion. In particular, the invention is concerned with a process for the densification of poly-α-olefins wherein solvent, in contact with a poly-α-olefin, is removed by heating with water at elevated temperatures and pressures, while at the same time increasing the bulk density of the polymer. In a specific aspect, this invention relates to stripping residual solvent from a polyethylene or polypropylene powder having a bulk density of 2–10 lb. per cubic foot while at the same time converting the polymer to a granular form having a bulk density of 30–50 lb. per cubic foot.

Poly-α-olefins, for example, those produced by the low pressure polymerization procedures in the presence of inert organic liquid solvents employing catalysts comprising an oxide or salt of a transition element, from the fourth to the sixth subgroups of the Periodic Table, with or without an activator, from the first to the third groups of the Periodic Table are usually obtained in the form of finely divided powders having a very low bulk density. Typical catalysts employed in this type of polymerization procedure include, for example, chromium as chromium oxide, including a substantial portion of hexavalent chromium associated with at least one porous oxide selected from the group consisting of silica, alumina, zirconia and thoria and the alkali metal promoted molybdenum oxide on gamma-alumina. The polymerization is generally carried out in the liquid phase such as in a hydrocarbon solvent or diluent, especially a paraffin or cycloparaffin which is liquid under the polymerization conditions.

The term "bulk density" refers to the weight per unit volume of a bed of the particulate material, the voids in and between the solid particles being filled with air or inert gas at atmospheric pressure. Whether the polymerization is carried out in the slurry phase or in solution and the polymer then precipitated, the poly-α-olefin is obtained in the form of a fluffy powder having a very low bulk density, i.e., in the order of 2–10 lb. per cubic foot. In low bulk density powders of this kind, from 80 to more than 95% of the apparent volume consists of voids. In the direct extrusion of such low bulk density powders, the high speeds required to obtain reasonable extrusion rates leads to considerable degradation and lowers the molecular weight of the polymers.

In order to utilize low bulk density poly-α-olefins for the purpose of thermally shaping the polymeric solid into useful articles by injection molding, extrusion or the like, it is necessary to melt the polymer particles, to separate the air from the voids, and to fuse the polymer particles into a homogeneous melt that is substantially free of dissolved gas.

The direct melting of low bulk density solid polymers, for example, by applying heat to a vessel or extruder containing the same has been found to be quite unsatisfactory for many reasons among which are these: the low heat conductivity of the polymer, especially of low density solid polymer powder particles, retards the flow of heat from the heating surface through the interior of the powder and the polymer immediately adjacent to the heating surface is often scorched and/or thermally degraded by the prolonged heating and excessively high temperatures required to drive heat into portions of the polymer powder that are remote from the heat surface. In addition, the air initially contained in the voids of the low density powder leads to oxidation and cross-linking reactions which results in a polymer of inferior quality. Furthermore, the conversion of low bulk density polymer powders to shapes or granules suitable for injection molding or extrusion by employing high speed extruders also leads to degradation of the polymer powders.

In addition, the polymerization obtained in the above-mentioned processes contain residues of the catalyst used resulting in a certain ash content of the finished product. The amount of this ash content is dependent, to a large extent, upon the type of catalyst used. Prior to the further use of the polymerizates, these residues of catalyst which are still present must be removed as completely as possible.

The process of the present invention now provides a method for obtaining poly-α-olefins in dense granular form without actually melting the polymer, while at the same time reducing the final ash content of the polymer. As indicated, this invention is particularly applicable to densifying polymers prepared by the low pressure polymerization procedures referred to above. However, polymers prepared in the presence of inert liquid organic solvents or diluents using other catalyst systems can be densified by the method of this invention.

It is accordingly an object of this invention to provide poly-α-olefins in dense granular form suitable for molding or extrusion.

Another object of this invention is to provide a novel process for recovering poly-α-olefins produced by low pressure polymerization procedures in the form of granules having a high bulk density, i.e. in the range of 30 to 50 lb. per cubic foot.

Another object of the invention is to provide a process for the densification of poly-α-olefin powders wherein solvent, in contact with poly-α-olefin, is removed by slurrying the solvent wet polymer in water and heating at elevated temperatures and pressures, but below the Vicat softening point of the polymer.

Another object of this invention is to provide a novel process which, in addition to removing solvent in contacting with a poly-α-olefin and densifying the polymer powder, also lowers the residual ash content of the polymer product.

Still another object of this invention is to provide a convenient, commercially feasible process for the recovery of poly-α-olefins in granular form having a high bulk density which process can be readily adapted to the conventional α-olefin polymerization processes employing inert organic liquid reaction media.

Other objects and advantages of the invention will be evident from the following description and claims.

In accordance with this invention, it has been found that a polymer having a high bulk density suitable for injection molding and extrusion can be obtained by slurrying a poly-α-olefin in particulate form containing less than 10 weight percent of an inert organic liquid solvent in water and heating this slurry to a temperature within the range of about 5 to about 15° C. below the Vicat softening point of the polymer. Thus, according to this invention, a poly-α-olefin in particulate form, i.e. in the form of granular or pulverulent solid particles, having a low bulk density and containing less than 10 weight percent of an inert liquid organic solvent, is dispersed in water and the resulting dispersion heated to a temperature within the range of about 5 to about 15° C. below the Vicat softening point of the polymer.

By the practice of this invention, advantage is taken of the plasticizing action of any solvent dissolved in the polymer powder itself to effect densification at a temperature below its softening point. Several distinct advantages are achieved by operating in this manner. For example, the process of this invention permits solid polymer powders to be heated quickly and uniformly without fusion to eliminate solvent remaining with the polymer after its preparation, i.e. residual solvent, in the absence of air to produce a high bulk density granular material suitable for shaping into useful articles. In addition, the heating operation at elevated temperatures and pressures in the presence of solvent dissolved in the polymer permits washing of the polymer under maximum porosity conditions with a resultant lowering of the residual ash content.

For the reasons previously stated, it is preferred to employ a poly-α-olefin which contains less than about 25 weight percent and more preferably less than about 10 weight percent of inert organic liquid solvent, e.g. a solvent wet polymerization cake, in the process of this invention. However, as indicated above, it is feasible to increase the bulk density of a poly-α-olefin in particulate form by slurrying the polymer in water in the absence of inert organic liquid solvent and heating the slurry at a temperature within the above-mentioned range. Thus, the solvent can be completely removed from a polymerization product by slurrying the solvent wet polymer in water and heating this slurry at a temperature within the range of about 90 to 100° C. for a period of time sufficient to remove all of the solvent. The temperature of the water slurry is then raised to within 5 to 15° C. below the Vicat softening point of the polymer to effect densification.

Although steam stripping operations are commonly practiced, the process of this invention is quite distinct from the conventional prior art processes in that after heating a water slurry of a solvent containing poly-α-olefin at normal temperatures and pressures to remove the solvent on the surface of the polymer, the temperature is then raised to within 5 to 15° C. below the Vicat softening point which is high enough to cause densification of the polymer while removing the solvent, i.e. about 10 weight percent, which is dissolved within the polymer. It is a surprising feature of this invention that densification of the poly-α-olefin is actually achieved under these conditions since the polymer granules are never actually softened or melted as in the case of conventional prior art processes.

Polyethylene is densified according to the process of this invention by employing a stirred vessel at temperatures in the range of about 104 to about 120° C. which temperatures are achieved by maintaining pressures of about 2 to about 15 p.s.i.g. on the vessel. Any residual solvent dissolved in the polyethylene is completely removed and densification takes place. With polypropylene, temperatures up to about 140° C. and pressures up to about 37 p.s.i.g. are employed. In each case, granules ranging in size from 2 to 10 mesh and having a density of 30 to 50 lb. per cubic foot are obtained. The polymer slurry which is withdrawn from the stirred processing vessel can be dried by any suitable means, including evaporation, air drying on a shaker table and the like.

During the heating period, agitation of the slurry at about 250 to about 300 r.p.m. can be employed in order to provide uniform heating of the slurry. When the slurry reaches the desired densification temperature, i.e. 5 to 15° C. and more preferably 5 to 10° C. below the Vicat softening point of the polymer, the heating and agitation is continued for a time sufficient to increase the bulk density of the polymer powder to within 30 to 50 lbs. per cubic foot. The heating period for this densification procedure will vary within wide limits since it depends upon a number of variables including particle size, amount of solvent, if any, which is present and the final bulk density of the polymer. Generally, this densification procedure will vary over a period of several minutes to several hours, however, a period of about 15 minutes to about 1 hour within the prescribed temperature range is effective. It is desirable to heat the slurry by bubbling steam through it since this procedure effects a steam stripping of any solvent present while at the same time furnishing the necessary heat.

In practicing this invention, a granular or pulverulent solid poly-α-olefin is admixed with water in relative preparations such that there results a stirrable slurry of solid particles. At least 50 and preferably 65 volume percent of water is required to form a suitable slurry. It is usually convenient to use from 50 to 95 volume percent of water and correspondingly from 50 to 5 volume percent of polymer solid, although 10 to 35 volume percent of solid polymer is preferred.

As indicated above, it is possible to remove the major portion of solvent or diluent from a solution or slurry of poly-α-olefin by slurrying in water and heating at atmospheric pressure and then to carry out the final stages of the operation at elevated temperatures and pressures to densify the polymer. Hence, we can charge a steam stripping vessel with a slurry of the low bulk density poly-α-olefin powder or simply with a cake of the polymer powder wet with the precipitation solvent from which it was precipitated, and remove residual solvent and densify the polymer powder at the same time by heating at slightly increased pressures. It is important when charging a slurry of polymer powder to the heating operation in the presence of considerable solvent to remove most of the solvent, i.e. about 50 to about 90 weight percent, at temperatures not in excess of 100° C. After removing the main body of the solvent by heating at atmospheric pressure, the final stage of the operation is carried out at elevated temperatures and pressures. In the case of a poly-α-olefin such as polyethylene, the densification is carried out at elevated temperatures up to and including 120° C. With polypropylene, however, this densification is carried out at temperatures up to and including 140° C. The pressures to be employed will, of course, correspond to the partial pressure of water at the particular temperature employed.

As stated previously, the process of this invention can be used to densify α-olefin polymers generally, and is particularly applicable to densifying polymers which are prepared by the conventional low pressure processes. The process is particularly adapted to the densification of polymers of α-olefins containing 2 to 10 carbon atoms. Hence, polymers which can be densified in accordance with the process of this invention include, for example, polyethylene, polypropylene, polybutene, poly-3-methyl-butene-1, poly-4-methyl-pentene-1, polyhexene, as well as copolymers of these and other α-olefins, for example a 95/5 propylene ethylene polymer and the like.

In Table I below, are given the Vicat softening points and the upper temperature limits employed in the densification of a variety of poly-α-olefin polymers together with their Vicat softening points. The Vicat softening point of a polymer is that temperature at which a flat-ended needle of one sq. mm. cross-section will penetrate a sample of the polymer to a depth of 1 mm. under a 1,000 g. load and a uniform rate of temperature rise of 50° C. per hour. The Vicat softening point for the gross polymer will generally be some 5 to 10° below the softening point of the completely crystalline poly-α-olefin due to the presence of atatic or amorphous polymer.

TABLE I

| Polyolefin | Vicat softening point, ° C. | Upper densification Temperature limit, ° C. |
|---|---|---|
| Polyethylene | 120–126 | 110–115 |
| Polypropylene | 146–151 | 135–140 |
| Polybutene-1 | 110–112 | 103–105 |
| Poly-3-methylbutene-1 | 250–260 | 210–245 |
| Poly-4-methylpentene-1 | 210–220 | 190–200 |
| 95/5 propylene-ethylene Copolymer | 121 | 110–115 |

Typical inert liquid organic solvents which are conventionally used in the polymerization of α-olefins and which can be removed by the process of our invention while at the same time densifying the polymer include the aliphatic and cycloaliphatic hydrocarbons as well as the aromatic and alkylaromatic compounds. Such solvents are well known in the prior art and include such compounds as propane, isobutane, pentane, hexane, isooctane, xylene, cumene, cyclohexane, decane and highly paraffinic, high boiling solvents such as odorless naphtha and mineral spirits. In addition, these solvents can be replaced with other inert liquid organic solvents which are not conventionally used in the polymerization procedures, e.g. aliphatic alcohols including methanol, ethanol, propanol, butanol, isobutanol and the like. This aspect of the invention is illustrated in Example 4.

This invention can be further illustrated by the following examples of preferred embodiments thereof, although it will be understood that these examples are included merely for purposes of illustration and are not intended to limit the scope of the invention unless otherwise specifically indicated:

*Example 1*

Five hundred sixty-two pounds of a polyethylene cake wet with mineral spirits, boiling point 190–210° C., was charged to a 500-gallon stainless steel agitated jacketed vessel containing 200 gallons of water. The surface solvent was removed rapidly by azeotroping with water at 94–96° C. while agitating at a rate of 300 r.p.m. As the organic layer in the take off decreased the temperature in the vessel was gradually raised to 110–112° C. by valving down on the vapor discharge line from the vessel so that a pressure of 6–8 pounds was maintained on the vessel. After all of the solvent was removed, the heating of the slurry was continued for 30 minutes and the polymer slurry was then dropped to a shaker table and dried with air. The air dried polymer had a shape and size approximating rice granules and a bulk density of 42 pounds per cubic foot. The ash content of the polymer was 0.046 percent.

In contrast, a one-pound portion of the solvent wet cake sampled from the charge to the steam distillation vessel was freed of mineral spirits by extracting with hexane and air dried. The resultant polymer powder had a bulk density of 6.2 pounds per cubic foot and the residual ash was 0.11 percent.

*Example 2*

Four hundred twenty-five pounds of a polypropylene powder wet with mineral spirits was charged to the 500-gallon stainless steel agitated jacketed vessel with 250 gallons of water. Surface solvent was removed by azeotroping with water at 94–96° C. at atmospheric pressure while agitating at the rate of 280 r.p.m. As the organic layer in the take off decreased, the temperature in the vessel was gradually raised to 140° C. over a period of 1 hour by valving down on the vapor discharge from the vessel so that a pressure of 37 pounds was finally reached. After all traces of solvent in the overhead condensate was gone, the heating and stirring was continued for one hour and the polymer slurry was then dropped to a shaker table and dried with air. The polypropylene granules had an average mesh size of 4–6 and a bulk density of 37 pounds per cubic foot. The residual ash content was 0.012 percent.

In contrast, a one-pound portion of the solvent wet cake obtained from the precipitation vessel was freed of mineral spirits by extracting with hexane and then air dried. The resultant polypropylene powder had a bulk density of 4.7 pounds per cubic foot and the ash content was 0.037.

*Example 3*

Ethylene was polymerized in a stirred autoclave at a temperature of 260° C. and a pressure of 1000 p.s.i.g. in the presence of sodium promoted molybdenum oxide (average valence 4.34) on gamma-alumina catalyst. Mineral spirits was employed as solvent. The polymer solution was diluted with mineral spirits and filtered. The slurry of fine polyethylene powder in mineral spirits was fed to an agitated 500-gallon tank containing 200-gallons of water and the surface solvent was removed rapidly from the polymer slurry as it was fed to the tank by azeotroping with water at 94–96° C. while agitating at a rate of 300 r.p.m. Heat was supplied to the vessel by introducing sparge steam into the bottom of the vessel. As the organic layer in the overhead substantially decreased the temperature in the vessel was gradually raised to 110°–115° C. by valving down on the vapor discharge from the vessel so that a pressure of 6–9 pounds was maintained on the vessel. In this manner approximately 100 pounds of additional mineral spirits was recovered overhead. After all of the solvent had been removed the heating of the slurry was continued for 30 minutes and the polymer slurry was then dropped to a shaker table and dried with air. The polyethylene granules had an average mesh size of 4–6 mesh, a color of 2, a melt index of 5.1, a residual ash content of 0.016 weight percent and a bulk density of 39 pounds per cubic foot.

*Example 4*

Propylene was polymerized in a stirred autoclave at a temperature of 82.5° C. and a pressure of 320 p.s.i.g. in the presence of an ethyl aluminum sesquichloride-titanium trichloride-hexamethyl phosphoramide catalyst. Odorless mineral spirits was employed as solvent. In addition, hydrogen was employed to control the inherent viscosity of the polymer. Upon completion of the polymerization the autoclave was discharged to a centrifuge feed tank and the mineral spirits was separated from the polymer cake by centrifuging. The polymer was then discharged to a tank of hot isobutanol, centrifuged and reslurried in hot isobutanol (107° C.) five times to effect removal of the catalyst.

Following the final wash the polymer was discharged from the centrifuge to a 500-gallon stainless steel stirred vessel containing 200 gallons of hot water. The residual isobutanol was azeotroped off with water at a temperature of 88–89° C. at atmospheric pressure while agitating at the rate of 300 r.p.m. and feeding sparge steam into the bottom of the vessel to supply heat. When the isobutanol separation was completed the temperature in the vessel was gradually raised to 142° C. over a period of one hour by valving down on the vapor discharge from the vessel so that a pressure of 38 pounds was finally reached. The heating and stirring was continued for one hour and the polymer slurry was then dropped to a shaker table and air dried. The polypropylene granules had an average mesh size of 4–8 and a bulk density of 38 pounds per cubic foot. The residual ash content was 0.01 weight percent.

In a similar manner, using the respective temperatures set forth in Table I, polybutene-1, poly-3-methylbutene-1, poly-4-methylpentene-1 and a 95/5 polypropylene-ethylene copolymer can be densified.

Thus, by the practice of this invention there is provided a method for obtaining poly-$\alpha$-olefins in dense form suitable for molding or extrusion without actually melting the polymer while at the same time reducing its final ash content. Furthermore, in accordance with this invention, poly-$\alpha$-olefins which are produced by low pressure polymerization procedures can be obtained in the form of granules having a high bulk density, i.e. in the range of 30 to 50 lbs. per cubic foot.

Although the invention has been described in considerable detail with reference to certain preferred embodiments thereof, it will be understood that variations and

We claim:

1. A method for increasing the bulk density of a solid polymer which comprises slurrying a low bulk density poly-α-olefin in particulate form containing a small portion of an inert organic liquid solvent in water and heating the resulting slurry at a temperature within the range of about 5 to 15° C. below the Vicat softening point, for at least about 15 minutes, to form a poly-α-olefin of increased bulk density.

2. A method for increasing the bulk density of a solid polymer which comprises slurrying a poly-α-olefin in particulate form having a bulk density of 2 to 10 lbs. per cubic foot containing a small portion of an inert organic liquid solvent in water and heating the resulting slurry at a temperature within the range of about 5 to 15° C. below the Vicat softening point, for at least about 15 minutes, to form a poly-α-olefin having a bulk density of 30 to 50 lbs. per cubic foot.

3. A method according to claim 1 where in the slurry is heated at a temperature within the range of about 10 to 15° C. below the Vicat softening point of the polymer.

4. A method for increasing the bulk density of a solid polymer which comprises slurrying a low bulk density poly-α-olefin in particulate form containing less than about 25 weight percent of an inert organic liquid solvent in water and heating the resulting slurry at a temperature within the range of about 5 to 15° C. below the Vicat softening point of said polymer, for at least about 15 minutes, to form a poly-α-olefin of increased bulk density.

5. A method for increasing the bulk density of a solid polymer which comprises slurrying a low bulk density poly-α-olefin in particulate form containing less than about 10 weight percent of an inert organic liquid solvent in water and heating the resulting slurry at a temperature within the range of about 5 to 15° C. below the Vicat softening point of said polymer, for at least about 15 minutes, to form a poly-α-olefin of increased bulk density.

6. A method for increasing the bulk density of polyethylene which comprises slurrying low bulk density polyethylene in particulate form containing less than about 10 weight percent of an inert organic liquid solvent in water and heating the resulting slurry, for at least about 15 minutes, at a temperature within the range of about 110° to about 115° C., said temperature being in the range of about 5 to 15° C. below the Vicat softening point of the polymer, to form polyethylene of increased bulk density.

7. A method for increasing the bulk density of polypropylene which comprises slurrying low bulk density polypropylene in particulate form containing less than about 10 weight percent of an inert organic liquid solvent in water and heating the resulting slurry, for at least about 15 minutes, at a temperature within the range of about 135° to about 140° C., said temperature being in the range of about 5 to 15° C. below the Vicat softening point of the polymer, to form polypropylene of increased bulk density.

8. A method for increasing the bulk density of polybutene-1 which comprises slurrying low bulk density polybutene-1 in particulate form containing less than about 10 weight percent of an inert organic liquid solvent in water and heating the resulting slurry, for at least about 15 minutes, at a temperature within the range of 103° to about 105° C., said temperature being in the range of about 5 to 15° C. below the Vicat softening point of the polymer, to form polybutene-1 of increased bulk density.

9. A method for increasing the bulk density of poly-3-methylbutene-1 which comprises slurrying low bulk density poly-3-methylbutene-1 in particulate form containing less than about 10 weight percent of an inert organic liquid solvent in water and heating the resulting slurry, for at least about 15 minutes, at a temperature within the range of about 210° to about 245° C., said temperature being in the range of about 5 to 15° C. below the Vicat softening point of the polymer, to form poly-3-methylbutene-1 of increased bulk density.

10. A method fo increasing the bulk density of poly-4-methylpentene-1 which comprises slurrying low bulk density poly-4-methylpentene-1 in particulate form containing less than about 10 weight percent of an inert organic liquid solvent in water and heating the resulting slurry, for at least about 15 minutes, at a temperature within the range of about 190° to about 200° C., said temperature being in the range of about 5 to 15° C. below the Vicat softening point of the polymer, to form poly-4-methylpentene-1 of increased bulk density.

11. A method for increasing the bulk density of a polymer which comprises slurrying a low bulk density poly-α-olefin in particulate form containing an inert organic liquid solvent in water, heating at a temperature not in excess of 100° C. to remove at least 90 weight percent of the solvent and continuing heating said slurry, for at least about 15 minutes, at a temperature within the range of about 5 to 15° C. below the Vicat softening point of the polymer to form a poly-α-olefin of increased bulk density.

12. A method for increasing the bulk density of polyethylene which comprises slurrying a low bulk density polyethylene in particulate form containing an inert organic liquid solvent in water, heating at a temperature not in excess of 100° C. to remove at least 90 weight percent of solvent and continuing heating said slurry, for at least about 15 minutes, at a temperature within the range of about 110° to about 115° C., said temperature being in the range of about 5 to about 15° C. below the Vicat softening point of the polymer, to form polyethylene of increased bulk density.

13. A method for increasing the bulk density of polypropylene which comprises slurrying a low bulk density polypropylene in particulate form containing an inert organic liquid solvent in water, heating at a temperature not in excess of 100° C. to remove at least 90 weight percent of solvent and continuing heating said slurry, for at least about 15 minutes, at a temperature within the range of about 135° to about 140° C., said temperature being in the range of about 5 to about 15° C. below the Vicat softening point of the polymer, to form polypropylene of increased bulk density.

14. In a process for the polymerization of at least one α-olefin in an inert organic liquid solvent by means of a metal oxide catalyst effective to polymerize said α-olefin and including an oxide of a metal from the fourth to the sixth groups of the Periodic Table, the improvement which comprises slurrying the poly-α-olefin in particulate form containing less than 10 weight percent of said solvent in water and heating said slurry at a temperature within the range of about 5 to 15° C. below the Vicat softening point of the polymer, for at least about 15 minutes, to form a dense granular poly-α-olefin suitable for molding and extrusion.

15. In a process for the polymerization of ethylene in an inert organic liquid solvent by means of a metal oxide catalyst effective to polymerize said ethylene and including an oxide of a metal from the fourth to the sixth groups of the Periodic Table, the improvement which comprises slurrying the polyethylene in particulate form containing less than 10 weight percent of said solvent in water and heating said slurry, for at least about 15 minutes, at a temperature within the range of about 110° to about 115° C., said temperature being in the range of about 5 to about 15° C. below the Vicat softening point of the polymer, to form a dense granular polyethylene suitable for molding and extrusion.

16. In a process for the polymerization of propylene in an inert organic liquid solvent by means of a metal oxide catalyst effective to polymerize said propylene and including an oxide of a metal from the fourth to the sixth groups of the Periodic Table, the improvement which comprises slurrying the polypropylene in particulate form containing less than 10 weight percent of said solvent in water and heating said slurry, for at least about 15 minutes, at a temperature within the range of about 135° to about 140° C., said temperature being in the range of about 5 to about 15° C. below the Vicat softening point of the polymer, to form a dense granular polypropylene suitable for molding and extrusion.

References Cited by the Examiner

UNITED STATES PATENTS

| | | | |
|---|---|---|---|
| 2,831,846 | 4/58 | Edmonson et al. | 260—94.9 |
| 2,838,477 | 6/58 | Roelen et al. | 260—94.9 |
| 2,886,561 | 5/59 | Reynolds et al. | 260—94.9 |
| 2,908,670 | 10/59 | Hagemeyer | 260—93.7 |
| 2,951,067 | 8/60 | Cash | 260—94.9 |
| 2,981,727 | 4/61 | Boeke et al. | 260—93.7 |
| 3,119,797 | 1/64 | McGaughy et al. | 260—94.9 |

JOSEPH L. SCHOFER, *Primary Examiner.*

L. H. GASTON, M. LIEBMAN, *Examiners.*